United States Patent [19]
Maerz et al.

[11] Patent Number: 5,732,571
[45] Date of Patent: Mar. 31, 1998

[54] METHOD TO REDUCE FLUE GAS IN INCINERATION PROCESSES

[75] Inventors: Herbert Maerz, Stuttgart; Rasi Hatami, Kaarst; Dieter Traeger, Reutlingen, all of Germany

[73] Assignees: Messer Griesheim GmbH; SBW Soderabfallentsorgung, both of Germany

[21] Appl. No.: 705,519

[22] Filed: Aug. 29, 1996

[30] Foreign Application Priority Data

Aug. 29, 1995 [DE] Germany ............ 195 31 842.0

[51] Int. Cl.$^6$ .......................................... F25J 1/00
[52] U.S. Cl. .................. 62/611; 62/618; 62/929
[58] Field of Search .................. 62/611, 618, 929

[56] References Cited

U.S. PATENT DOCUMENTS

| | | | |
|---|---|---|---|
| 4,547,209 | 10/1985 | Netzer | 62/929 |
| 4,681,612 | 7/1987 | O'Brien et al. | 62/929 |
| 4,704,146 | 11/1987 | Markbreiter et al. | 62/929 |
| 4,762,543 | 8/1988 | Pantermuehl et al. | |
| 4,822,394 | 4/1989 | Zeigler et al. | |
| 5,060,480 | 10/1991 | Saulnier | |

FOREIGN PATENT DOCUMENTS

| | | |
|---|---|---|
| 0 503 910 A | 9/1992 | European Pat. Off. |
| 3926964 | 2/1991 | Germany. |
| 4313102 | 10/1994 | Germany. |
| 59-073416 A | 8/1984 | Japan. |
| 04 048 185 A | 2/1992 | Japan. |
| 94 14 301 U | 2/1995 | Japan. |
| WO 94 01724 A | 1/1994 | WIPO. |

OTHER PUBLICATIONS

Energy Conversion and Management, Bd. 37, Nr. 6/08, 1 Juni 1996, Seiten 903-908, XP000555883 Shao Y et al: "Power Plants with $CO_2$ Capture Using Integrated Air Separation and Flue Gas Recycling".

*Primary Examiner*—Ronald C. Capossela
*Attorney, Agent, or Firm*—Connolly & Hutz

[57] ABSTRACT

The invention relates to a method to reduce flue gas in incineration processes that are carried out with an oxidizing incineration gas consisting of a flue gas that is returned to the circulation system and of a technically produced oxygen. A stoichiometrically-related proportion of the flue gas that is not added to the incineration gas has a $CO_2$ fraction greater than 70%. In order to reduce the flue gas, the fraction of flue gas that is returned and not used as incineration gas in the incineration process is removed from the circulation system and liquefied in the device.

23 Claims, 2 Drawing Sheets

METHOD TO REDUCE FLUE GAS IN INCINERATION PROCESSES

BACKGROUND OF THE INVENTION

The present invention relates to a method to reduce flue gas in incineration processes.

Incineration processes such as those employed, for instance, in incineration plants for household waste and hazardous waste, or in power plants and industrial plants, release tremendous amounts of flue gas every year.

In view of the changes that can be observed in the Earth's climate, massive efforts are being undertaken throughout the world in order to employ various methods to counter the pollutants contained in the flue gas that are inevitably generated during incineration processes.

When it comes to incineration processes, a distinction is made between primary and secondary measures aimed at preventing the formation of pollutants. The most important aspect for an incineration process is the incineration medium employed in it.

On the basis of the incineration medium, it can be ascertained whether it is possible to comply with the values stipulated in the German Clean Air Regulations (TA Luft) or in the 17th German Emission Protection Regulations (BImschV) exclusively by means of primary measures or whether secondary measures are additionally necessary.

Thus, for example, in the case of a gas-turbine power plant fired with natural gas, primary measures such as, for instance, the use of hybrid burners might be fully sufficient not only to comply with the prescribed limit values, but even to fall below these values. On the other hand, in the case of a coal-fired power plant, for example, it is already necessary to turn to secondary measures in order to sufficiently remove the sulfur, dust and nitric oxides so as to adhere to the limit values laid down.

The situation is particularly extreme with heterogenous incineration processes, especially household or hazardous waste incineration.

Here, it is necessary to set up numerous secondary measures in the form of a flue-gas purification installation so that it is possible, in addition to removing the sulfur, dust and nitric oxides, to also separate out halogen compounds, heavy metals and, last but not least, dioxin and furans.

As a result, the installations have become increasingly more complex and have long since reached and at times even surpassed the limits of what is economically feasible.

In view of the reasons outlined above, intensified efforts are being undertaken to create primary measures to counter the negative consequences of incineration processes. In this context, the greatest endeavors can be seen in the area of nitric oxide formation. Seven different nitrogen oxide compounds are currently known, whereby nitrogen dioxide ($NO_2$) and nitrogen monoxide (NO) are the most stable and therefore are the main constituents of the nitrogen oxide load in the flue gas.

In this process, nitrogen monoxide is primarily generated with sufficiently long retention times of the incineration gases in the combustion chamber above 1000° C. [1832° F.] and a sufficiently high oxygen concentration exclusively from components in the air, without chemical reactions with the fuel. Since incineration air consists of 78% nitrogen and 21% oxygen, the nitrogen oxides formed from nitrogen in the air make up the largest part of the pollutant load.

For this reason, in order to reduce the formation of nitrogen oxide, German patent no. 43 13 102 suggests that the incineration gas needed for the oxidation of the incineration products or fuels be formed on the basis of technically produced oxygen and flue gas. The flue gas generated during the incineration is mixed in a circulation system with the technically produced oxygen and then fed to the incineration process. In this manner, approximately 80% of the flue gas employed as a substitute for the nitrogen in the air is no longer generated as exhaust gas. Thus, all that is left is the amount of flue gas that is replaced by the admixture of the technical oxygen. Since the incineration takes places in the absence of air, the formation of nitrogen oxide is cut down due to the reduction of the fraction of nitrogen in the incineration gas.

As a result of this measure, it is possible to achieve a drastic reduction of the volume of flue gas to as low as 20% of the present value, while concurrently reducing the quantities of nitrogen oxide.

SUMMARY OF INVENTION

The object of the invention is to provide a method with which it is possible to achieve a further reduction of the flue gas.

With the method according to the invention, the proportion of flue gas is drastically reduced, preferably down to zero. This brings about a closed incineration profess free of flue gas in which most of the flue gas is circulated as a first stream and returned as incineration gas to the incineration system and the stoichiometrically remaining fraction or second stream of flue gas is removed from the circulation system and liquefied. It is then possible to dispense with the waste-gas smokestack that is normally needed with conventional incineration processes. The invention can liquefy highly concentrated $CO_2$ in an economical manner because the $CO_2$ fraction is equal to or greater than 70%, advantageously equal to or greater than 85%, as a result of the concentration in the circulation of flue gas. Thanks to the method according to the invention, waste gas that previously constituted a burden to the environment can now be converted into a product that can be manufactured and marketed in a cost-efficient manner. For the operator of the incineration plant, this translates into the environmental advantage of the absence of flue gases as well as into the economic advantages of a cost reduction in the incineration plant and earnings stemming from the sale of the product manufactured, namely, liquid $CO_2$.

Preferably, the technically produced oxygen to be used as incineration gas has a purity of at least 90%, preferably at least 93%, in the form of a cryogenic liquefied gas. Advantageously, the cryogenic liquefied oxygen is conveyed as a coolant to a heat exchanger for purposes of liquefying the flue gas. The fraction of flue gas earmarked for liquefaction flows through the heat exchanger in a parallel current, counter current or cross current to the coolant. In doing so, the coolant transfers coldness to the flue gas, evaporates in the process and flows in gas form to a mixer, where the oxidizing incineration gas which is necessary for the incineration and which stems from the flue gas obtained during the incineration process is mixed with the technically produced oxygen that had evaporated in the heat exchanger. The flue gas absorbs coldness in this process, cools down to −25° C. to −30° C. [−13° F. to −22° F.] and becomes liquefied. The liquid $CO_2$ is kept in a $CO_2$ storage tank at temperatures between −20° C. and −30° C. [−4° F. to −22° F.] and at pressures ranging from 14 to 20 bar.

THE DRAWINGS

The drawing depicts an embodiment of the invention which is described in greater detail below.

FIG. 1 is a diagram of the incineration process according to the invention, with the liquefaction of the flue gas; and FIG. 2 is a diagram of the $CO_2$-liquefaction of the flue gas by means of a separate cooling installation.

DETAILED DESCRIPTION

Figure 1:
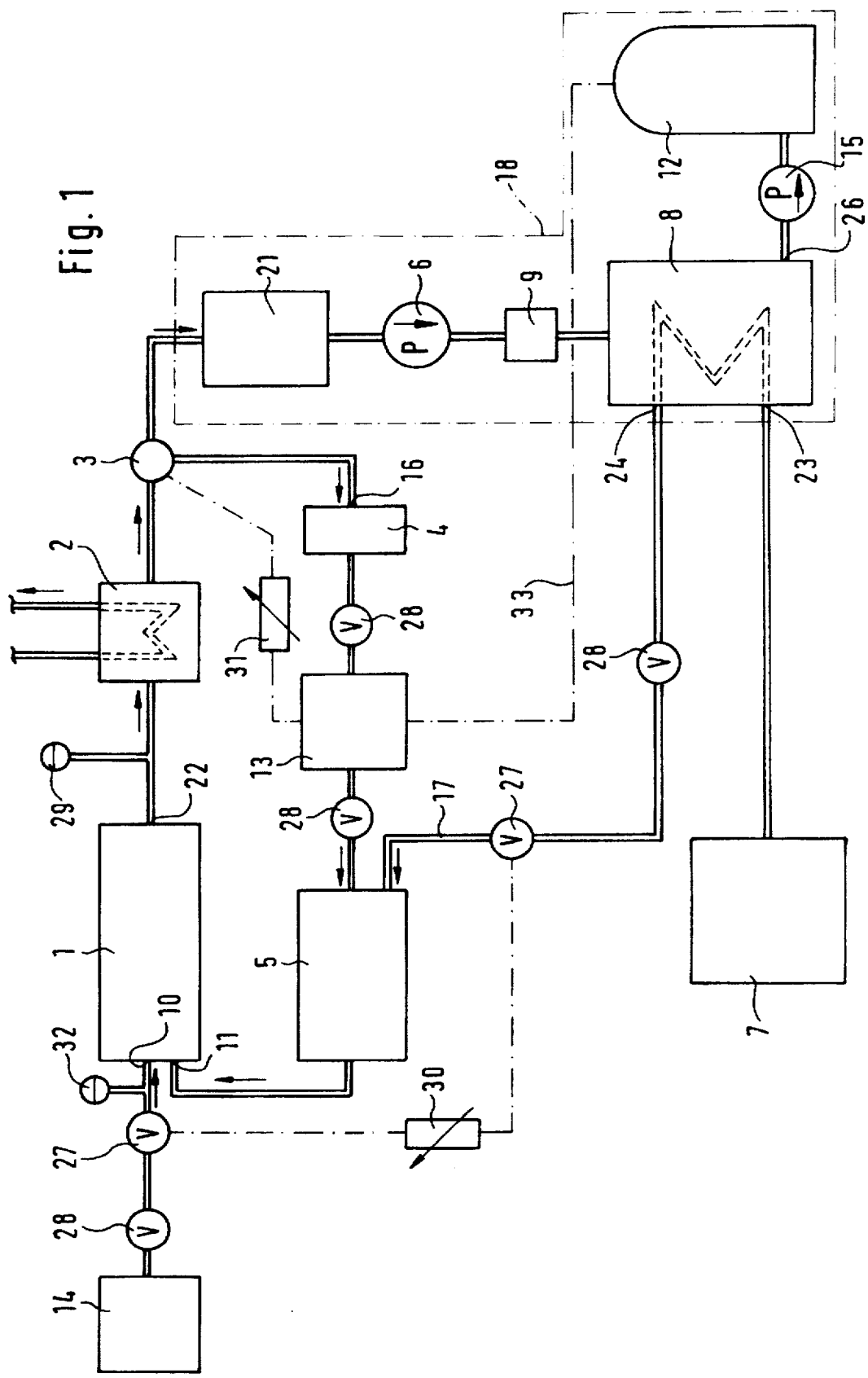

According to the schematic representation in FIG. 1, an incineration process takes place in the absence of air in the incineration unit 1 at temperatures between 800° C. and 1000° C. [1472° F. and 1832° F.]. As the raw material, a fuel from the fuel supply station 14, preferably a monofuel such as natural gas, landfill gas and/or light heating oil, is fed to the incineration unit 1, for example, a power plant, at inlet 10, and an oxidizing incineration gas is fed in at inlet 11. In this context, the fuel supply is connected to the incineration unit 1 via a quick-acting gate valve 28 and a control valve 27. In this manner, fuel and oxidizing incineration gas be mixed together either prior to or in the incineration unit 1, as desired. Here, the fuel is burned essentially stoichiometrically in order to obtain high $CO_2$ concentrations in the flue gas and to avoid any oxygen contents. The flue gas generated during the incineration of the fuel flows in circulation unit 16 through heat exchanger 2 and then back to the incineration unit 1 while being mixed together with technically produced oxygen.

In the heat exchanger 2, the flue gas is cooled down to approximately 120° C. [248° F.] and the condensate is separated out. Downstream from the heat exchanger 2, in the flow direction of the flue gases, the circulation unit 16 is equipped with a control valve 3, an aspirator 4, a quick-acting gate valve 28, a gas supply unit 13 for a gas with a $CO_2$ fraction equal to or greater than 70%, especially a flue-gas intermediate buffer, a quick-acting gate valve 28 as well as a mixer 5. The mixer 5 is connected to an oxygen supply source 7 via a line 17, quick-acting gate valve 28 and heat exchanger 8. The oxygen breakdown is demonstrated in the example of an air-breakdown installation which provides the technically produced oxygen in the form of cryogenic liquefied gas. The cryogenic liquefied oxygen flows at a temperature between −150° C. and −180° C. [−238° F. and −292° F.] into the heat exchanger 8 and is converted into the gas phase as it releases its cold energy. The gaseous oxygen exiting from the heat exchanger 8 at a temperature of, for example, 20° C. [68° F.] passes through the flue-gas intermediate buffer 13 and proceeds to the mixer 5 where, together with the flue gas, it forms the oxidizing incineration gas that is fed to the incineration unit 1. The amount of technically produced oxygen necessary for a stoichiometric incineration depends on the residual oxygen concentration in the flue gas after the incineration and it is adjusted to said concentration. For this purpose, the concentration value of oxygen after the incineration is measured at measuring site 29 and this information is provided to the Lambda regulator Via measuring site 29, the Lambda regulator 30 receives the information on the quantity of fuel and calculates the volume of oxygen to be regulated via control valve 27 on the basis of the information pertaining to the amount of fuel and residual oxygen concentration after the incineration.

The flue gas generated by the incineration is first conveyed into a closed circulation unit 16 until a flue-gas pressure of, for instance, 1 bar absolute has built up in this circulation unit prior to the incineration. Once this pressure is exceeded, the control valve 3 is opened by means of the differential-pressure regulator 31 in order to convey the excess flue gas that is continuously being produced by the incineration to device 18 for purposes of liquefaction. Thus, a first stream of the flue gas is recirculated and a second stream of the flue gas is liquefied.

For the start-up procedure, the flue-gas intermediate buffer 13 is installed in the circulation unit 16. The flue-gas intermediate buffer 13 provides the amount of flue gas (nitrogen-free) that is needed to form the incineration gas for the start-up procedure. Another advantageous manner to provide $CO_2$ gas for the start-up procedure (beginning of the incineration) consists in the withdrawal 33 of the liquid $CO_2$ from storage tank 12, followed by evaporation. The $CO_2$ gas is conveyed to mixer 5 where, together with the oxygen, it forms the incineration gas.

From an energy standpoint, in order to achieve an optimum liquefaction of the flue gas with the concentrated $CO_2$ fraction equal to or greater than 70%, the flue gases containing water vapor which are withdrawn from control valve 3 and cooled down to about 30° C. [86° F.] are compressed to approximately 15 to 20 bar in the 2-stage compressor 6.

In the first stage, the flue gas is compressed to approximately 4 bar, the hot gases are cooled down again to about 30° C. [86° F.] in an intermediate cooler. In the second stage, the flue gas is brought to the desired final value of approximately 15 to 20 bar, preferably 18 bar, while the hot gases are re-cooled to 30° C. [86° F.]in an after-cooler. Most of the water in the flue gas is separated out in these coolers.

The compressor 6 is equipped with all necessary pressure instruments, temperature-measuring devices and the like (although they are not shown here).

The flue gas that has been compressed to approximately 15 to 20 bar still contains residual moisture and possibly other residues.

Subsequently, a dryer 9 constitutes a cleaning and drying stage.

The last process step of the $CO_2$-generating process is the liquefaction of the incineration gas. The fraction of flue gas which is present stoichiometrically in compressor 6 and which is replaced in mixer 5 by the oxygen is conveyed to heat exchanger 8 via inlet 25 as an evaporation agent for the cryogenic liquefied oxygen. The cryogenic liquefied oxygen that is preferably employed as the coolant flows at a temperature between −150° C. and −180° C. [−238° F. and −292° F.] into the heat exchanger 8 and releases its coldness to the flue gas. The carbon dioxide ($CO_2$) of the flue gas has a temperature ranging from 30° C. to 40° C. [86° F. to 104° F.], a pressure from 15 to 20 bar, and an enthalpy ranging from 800 to 820 kJ/kg. In order to liquefy the gaseous $CO_2$ in the flue gas, heat exchange in heat exchanger 8 is employed to set an enthalpy of 430 to 450 kJ/kg at a temperature between −20° C. and −30° C. [−4° F. and −22° F. ] and at a pressure of about 20 bar.

The incineration equation $$CH_4 + 2O_2 \text{S } CO_2 + 2H_2O$$

with the stoichiometric incineration from 2 m³ of oxygen results in 1 m³ of carbon dioxide, that is to say, the minimum weight ratio is $$X = kg\ O_2/kg\ CO_2 \geq 1.45$$

The enthalpy balance for the oxygen evaporation in heat exchanger 8 yields a specific evaporation heat for the oxygen of $$400 \frac{kJ}{kg O_2}.$$

The pressure (P) and enthalpy (h) diagram for carbon dioxide ($CO_2$) and the specific evaporation heat for oxygen yield a specific minimum amount of oxygen to $CO_2$ of $$y = \frac{KgO_2}{KgCO_2} = 0.9 \text{ to } 1.08.$$

A comparison between value X from the stoichiometry and Y from the enthalpy balance shows that the value is X>Y.

This means that there is sufficient coldness available in heat exchanger 8 to liquefy the $CO_2$.

In heat exchanger 8, the oxygen which enters at inlet 23 is converted into the gaseous phase and then it flows to mixer 5 via outlet 24. The proportion of flue gas that is removed from circulation unit 16 and conveyed to heat exchanger 8 is cooled at a pressure of approximately 18 bar to a temperature of about −25° C. to −30° C. [−13° F. to −22° F], after which it exits from heat exchanger 8 at outlet 26 in the form of liquefied $CO_2$.

Prior to the liquefaction, the flue gases might still contain small quantities of inert gases which cannot be removed by any of the cleaning processes provided. For this reason, heat exchanger 8 is equipped with a device to separate out these inert gases, which do not become liquefied at −25° C. to −30° C. [−13° F. to −22° F.]. The flow quantity of these inert gases is set one single time during the first start-up with simultaneous control of the corresponding $CO_2$ purity.

The $CO_2$ liquefied in heat exchanger 8 is conveyed to a storage tank 12. In this $CO_2$ storage tank 12, the liquid $CO_2$ is stored at temperatures between −20° C. and −30° C. [−4° F. to −22° F.] and pressures between 14 and 20 bar. According to another embodiment, the $CO_2$ can be made available in gaseous form to a consumer prior to its liquefaction.

If the flue gases contain sulfur or chlorine components, these are removed in a scrubber 21 positioned between control valve 3 and compressor 6. In scrubber 21, the pollutants of the flue gas are bonded to a detergent and subsequently the detergent and the pollutants are once again separated from each other.

Figure 2:
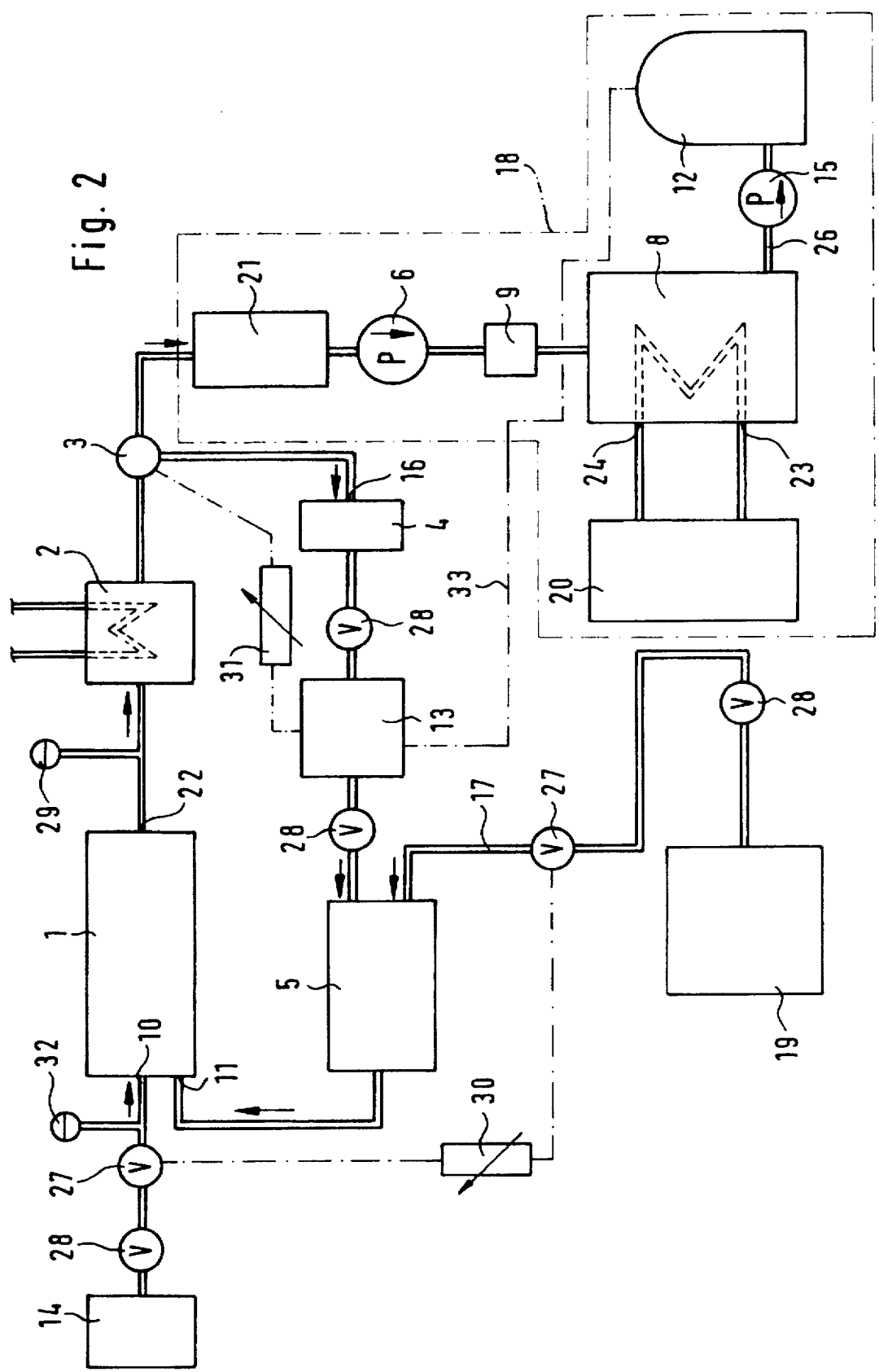

FIG. 2 shows an embodiment of the invention in which the technically produced oxygen is generated in an on-site installation. The corresponding installation parts have been assigned the same reference numbers in FIG. 2. Divergent from the installation depicted in FIG. 1, the gaseous oxygen produced in a pressure-exchange adsorption oxygen supply source or in a diaphragm oxygen supplier source 19 is conveyed directly to mixer 5, where it is mixed together with the flue gas. The incineration process and the liquefaction of the flue gas take place as described above. In this process, the coolant needed to liquefy the flue gas is supplied to the heat exchanger 8 by a cooling unit 20. Ammonia, R 22 or the like is employed as the coolant, which generates a cold energy of at least 370 to 400 kJ/kg.

Generally speaking, the process described above can also be used in incineration plants for household waste and hazardous waste. In such a case, however, it is necessary to have additional flue-gas purification installations, since these incineration plants employ heterogenous incineration processes so that it is difficult to predict the flue gas loads on the basis of the pollutant concentration of this flue gas. As a rule, these incineration processes for purifying all kinds of pollutants are used in conjunction with a corresponding flue-gas purification installation in order to separate such pollutants after utilizing the waste heat in the heat exchanger.

According to today's state of the art, these installations ensure compliance with the limit values laid down in 17th German Emission Protection Regulations (BImschV) and in several areas they even fall well below such values. Downstream from such systems, as shown in FIGS. 1 and 2, it would be possible to connect liquefaction equipment 18 for purposes of $CO_2$ liquefaction.

What is claimed is:

1. In a method to reduce flue gas in incineration processes which are carried out with an oxidizing incineration gas, consisting of recirculating a flue gas and technically produced oxygen in a circulation system and the flue gas is separated into a first stream which is recirculated and into a second stream which is a stoichiometrically-related proportion of the flue gas that has a concentrated $CO_2$ fraction greater than 70%, the improvement being in removing from the circulation system and liquefying the second stream.

2. Method according to claim 1, characterized in compressing the second stream of the flue gas to 15 to 20 bar in a compressor in flow communication with the circulation system, subsequently drying the compressed second stream in a dryer downstream from and in flow communication with the compressor, and then cooling the dried second stream down to temperatures between −25° C. and −30° C. in a heat exchanger downstream from and in flow communication with the dryer.

3. Method according to claim 2, characterized in feeding a coolant with at least 370 to 400 kJ/kg of $CO_2$ into the heat exchanger.

4. Method according to claim 2, characterized in feeding a coolant with at least 370 to 400 kJ/kg of $CO_2$ into the heat exchanger.

5. Method according to claim 4, characterized in generating the technical oxygen in the form of cryogenic liquefied gas, and feeding the cryogenic liquefied gas as a coolant into the heat exchanger prior to the formation of the incineration gas.

6. Method according to claim 5, characterized in converting the liquefied oxygen together with the second stream of the flue gas into the gas phase in the heat exchanger, and converting the second stream of the flue gas into the liquid phase while exchanging heat with the liquefied oxygen.

7. Method according to claim 6, characterized in that the incineration process treats monofuels.

8. Method according to claim 4, characterized in generating the technical oxygen by means of pressure-exchange adsorption or permeation.

9. Method according to claim 1 characterized in converting the liquefied oxygen together with the second stream of the flue gas into the gas phase in the heat exchanger, and converting the second stream of the flue gas into the liquid phase while exchanging heat with the liquefied oxygen.

10. Method according to claim 1, characterized in generating the technical oxygen by means of pressure-exchange adsorption or permeation.

11. Method according to claim 1, characterized in generating the technical oxygen in the form of cryogenic liquefied gas, and feeding the cryogenic liquefied gas as a coolant into the heat exchanger prior to the formation of the incineration gas.

12. Method according to claim 1, characterized in that the incineration process treats monofuels.

13. An installation for reducing flue gas in incineration processes which use monofuels and which are carried out with an oxidizing incineration gas consisting of a flue gas and of technically produced oxygen and in which the flue gas includes a recirculated first stream and a diverted second stream which is a stoichiometrically-related proportion of the flue gas having a concentrated $CO_2$ fraction greater than 70%, the installation comprising an incineration unit, a circulation system in flow communication with the incineration unit in which the first stream of the flue gas circulates between the outlet and the inlet of the incineration unit, at least one aspirator and mixer arranged in the flue gas circulation system, the aspirator being downstream from and in flow communication with the incineration unit, the mixer being in flow communication with and downstream from the aspirator, the mixer being connected to an oxygen supply source, the circulation system having a control valve between and in flow communication with the incineration unit and the aspirator for removing the second stream of the flue gas from the circulation system, and the control valve being connected to a device that serves to liquefy the removed second stream of flue gas.

14. Installation according to claim 13, characterized in that the device has a compressor and a dryer and a heat exchanger, the compressor being downstream from and in flow communication with the control valve, the dryer being downstream from and in flow communication with the compressor, and the heat exchanger being downstream from and in flow communication with the dryer.

15. Installation according to claim 14 characterized in that the heat exchanger is connected with a cooling unit.

16. Installation according to claim 14, characterized in that the inlet of the heat exchanger is connected to an oxygen supply source and the outlet of the heat exchanger is connected with the mixer, and the heat exchanger having a further inlet which is connected with the control valve and a further outlet which is connected to a storage tank.

17. Installation according to claim 16 characterized in that a scrubber positioned between and in flow communication with the control valve and the compressor.

18. Installation according to claim 17 characterized in that the mixer is connected with a pressure-exchange adsorption oxygen supply source or a diaphragm oxygen supplier source.

19. Installation according to claim 18, characterized in that the heat exchanger is connected with a cooling unit.

20. Installation according to claim 16 characterized in that a scrubber positioned between and in flow communication with the control valve and the compressor.

21. Installation according to claim 13, characterized in that the circulation system is connected with a gas supply source that supplies a $CO_2$ flue gas with a $CO_2$ fraction equal to or greater than 70% for the start-up procedures.

22. Installation according to claim 21, characterized in that the gas supply source is an intermediate buffer.

23. Installation according to claim 13 characterized in that the mixer is connected with a pressure-exchange adsorption oxygen supply source or a diaphragm oxygen supplier source.

* * * * *